US007246070B2

(12) United States Patent  (10) Patent No.: US 7,246,070 B2
Schwartz et al.  (45) Date of Patent: Jul. 17, 2007

(54) METHOD AND APPARATUS FOR BUNDLING INSURANCE COVERAGES IN ORDER TO GAIN A PRICING ADVANTAGE

(76) Inventors: James Dennis Schwartz, 5954 S. Monaco Way, Centennial, CO (US) 80111; Tom Bakos, P.O. Box 2006, Ridgway, CO (US) 81432

( * ) Notice: Subject to any disclaimer, the term of this patent is extended or adjusted under 35 U.S.C. 154(b) by 79 days.

(21) Appl. No.: 11/008,722

(22) Filed: Dec. 9, 2004

(65) Prior Publication Data

US 2006/0074724 A1   Apr. 6, 2006

Related U.S. Application Data

(60) Provisional application No. 60/612,821, filed on Sep. 24, 2004.

(51) Int. Cl.
*G06F 19/00* (2006.01)
(52) U.S. Cl. .......................................................... 705/4
(58) Field of Classification Search .................... 705/4, 705/2, 3
See application file for complete search history.

(56) References Cited

U.S. PATENT DOCUMENTS

| | | | | |
|---|---|---|---|---|
| 4,831,526 | A * | 5/1989 | Luchs et al. ................... | 705/4 |
| 5,070,452 | A * | 12/1991 | Doyle et al. ................... | 705/2 |
| 5,752,236 | A * | 5/1998 | Sexton et al. .................. | 705/4 |
| 5,873,066 | A * | 2/1999 | Underwood et al. .......... | 705/4 |
| 6,163,770 | A * | 12/2000 | Gamble et al. ................ | 705/4 |
| 6,283,761 | B1 * | 9/2001 | Joao ........................... | 434/236 |
| 6,615,181 | B1 * | 9/2003 | Segal ............................ | 705/4 |
| 2001/0034619 | A1 * | 10/2001 | Sherman ....................... | 705/4 |
| 2002/0052759 | A1 | 5/2002 | Cheng | |
| 2002/0082855 | A1 * | 6/2002 | Dickey et al. ................. | 705/1 |
| 2002/0103678 | A1 | 8/2002 | Burkhalter et al. | |
| 2003/0135394 | A1 | 7/2003 | Padron et al. | |
| 2003/0204417 | A1 * | 10/2003 | Mize ............................. | 705/2 |
| 2004/0148202 | A1 * | 7/2004 | Siefe et al. .................... | 705/4 |
| 2004/0176987 | A1 * | 9/2004 | Dial et al. ..................... | 705/4 |
| 2005/0027607 | A1 * | 2/2005 | Pearson ....................... | 705/26 |
| 2005/0137913 | A1 * | 6/2005 | Laning et al. ................. | 705/4 |

FOREIGN PATENT DOCUMENTS

JP       2002/183455   A   * 12/2000

OTHER PUBLICATIONS

Powell, Eileen Alt. "Premium Pets: Insurers Offering Health, Accident Coverage" Sep. 15, 2004. Lincoln Journal Star. p. 6.*
Dempsey, Eileen. "Insurance For Pets Starting To Take Off" Jun. 7, 2004. Columbus Dispatch. p. 01.B.*
PetCare. (www.petcareinsurance.com); via http://web.archive.org/web/*/http://www.petcareinsurance.com; last viewed on Aug. 4, 2005.*
Petshealth. (www.petshealthplan.com); via http://web.archive.org/web/*/http://www.petshealthplan.com; last viewed on Aug. 4, 2005.*
Bowen, Jill. "Pet Insurance On The Rise" Sep. 3, 2000. Roanoke Times & World News. p. NRV.10.*
Schlesinger, Harris; von der Schulenburg, J. Matthias Graf. "Consumer Information and Decisions to Switch Insurers" Dec. 1993. Journal of Risk and Insurance. vol. 60, Iss. 4.*
Eldredge, Debra. "Pills For Pets" Copyright 2003. Kensington Publishing Corp.*
Sacks, Ed. "The Savvy Renter's Kit" Copyright 1993. Real Estate Education Company.*
Bredenberg, Jeff. "2,001 Amazing Cleaning Secrets" Copyright 2004. The Reader's Digest Association, Inc.*
Rubin, Harvwy W. "Dictionary of Insurance Terms" Copyright 2000. Barron's Educational Series, Inc.*
Posey, Lisa L. "Switching Cost, Competition, and Pricing in Property/Casualty Insurance Market for Large Commercial Accounts" Spring 2003. Journal of Insurance Issues. vol. 26, Iss. 1. p. 29.*
Lipowski, Lisa. "Availability crisis in liability insurance markets: An application of implicit contract theory with asymmetric information" 1992.*
Bowen, Jill. "Pet Insurance On The Rise" Sep. 3, 2000. Roanoke Times & World News. Pr. NRV.10.*
Powell, Eileen. "Premium Pets: Insurers Offering Health, Accident Coverage" Sep. 15, 2004. Lincoln Journal Star. p. 6.*
Dempsey, Eileen. "Insurance For Pets Starting To Take Off" Jun. 7, 2004. Columbus Dispatch. p. 01.B.*
Petshealth (www.petshealthplan.com); via http://web.archive.org/web/*/http://www.petshealthplan.com; Apr. 10, 2001.*
Eldredge, Debra. "Pills For Pets" Copyright 2003. Kensington Publishing Corp.*
Sacks, Ed. "The Savvy Renter's Kit" Copyright 1993. Real Estate Education Company.*
Schlesinger, Harris et al. "Consumer Information and Decisions to Switch Insurers" Dec. 1993. Journal of Risk and Insurance. vol. 60, Iss. 4.*
Bredenberg, Jeff. "2,001 Amazing Cleaning Secrets" Copyright 2004. The Reader's Digest Association, Inc.*
PetCare. (www.petcareinsurance.com) @ http://web.archive.org/web/*/http://www.petcareinsurance.com; Jul. 18, 2003.*

(Continued)

*Primary Examiner*—C. Luke Gilligan
*Assistant Examiner*—Michael Tomaszewski
(74) *Attorney, Agent, or Firm*—Sheridan Ross P.C.; Jason H. Vick

(57) ABSTRACT

A method for reducing the lapse rate of a first insurance policy comprises the step of offering to sell a rider to said first insurance policy, said rider comprising benefit features, said benefit features configured such that the combination of said rider and said first insurance policy has a higher switching cost than the switching cost of said first insurance policy alone and said rider is constructively attached to said first insurance policy, whereby said step of offering to sell is at least in part performed by technological means. The first insurance policy may be a homeowner's policy. The rider may be a pet health insurance rider.

5 Claims, No Drawings

OTHER PUBLICATIONS

Feldblum, Sholom, "Persistency and Profits", *1990 Discussion Papers on Pricing*, Casualty Actuarial Society, 1990, Abstract p. 55.

Feldblum, Sholom, "Personal Automobile Premiums: An Asset Share Pricing Approach for Property/Casualty Insurance", *Proceedings Casualty Actuarial Society*, vol. LXXXIII, Part 2, No. 159, Casualty Actuarial Society, Nov. 10-13, 1996, pp. 190, 232, 233.

Green, Ranny, "Debate Swirls Around Pet Vaccinations", *The Seattle Times*, Aug. 24, 1997.

Jones, Rebecca, "Pet Insurance: What Price Peace of Mind", *Rocky Mountain News*, Nov. 1, 1997.

Winter, Christine, "Pet Health Insurance Plans Grow by Leaps and Bounds", *Sun-Sentinel Ft. Lauderdale*, Mar. 26, 2000.

Lepere, Renee, "Veterinary Health Plans are Available for Pet Owners in U.S.", Florida, Sep. 17, 2000.

Lin-Fischer, "Pet Health Insurance More Owners Buying Policies to Pay Vet Bills", *Akron Beacon Journal (OH)*, Oct. 14, 2002.

Dwyer, Steve, "Auto Alerts Prod Policyholders", *Insurance Networking News*, Apr. 1, 2003.

Razzi, Elizabeth et al., "The Lowdown on Premiums", *Kiplinger's Personal Finance*, vol. 57, No. 6, Jun. 1, 2003.

McCune, Jenny, "Save Money, Time with Consolidated Insurance Coverage", www.bankrate.com/brm/news/insurance/merge-policies1.asp, Sep. 23, 2003, last viewed Sep. 30, 2004.

"Multipolicy Discounts", Auto-Owners Insurance, archived Feb. 3, 2004, webarchive.org/web/20040203115603/http://www.auto-owners.com/ProductsMPD_2more_PL, last viewed Jan. 11, 2005.

"John Hancock Pitches Fixed Annuity to Pay for LTC Health Insurance", Insure.com, info.insure.com/ltc/hancockannuity501.html, Jun. 29, 2004.

"MORE TH>N", www.morethan.com, last viewed Jan. 14, 2005.

"MORE TH>N® Pet Insurance", Royal & Sun Alliance, R00340C, Jul. 2004.

\* cited by examiner

METHOD AND APPARATUS FOR BUNDLING INSURANCE COVERAGES IN ORDER TO GAIN A PRICING ADVANTAGE

CROSS-REFERENCE TO RELATED APPLICATION

This application claims the benefit of U.S. provisional patent application Ser. No. 60/612,821, filed Sep. 24, 2004, and entitled "Method and Apparatus for Bundling Insurance Coverages in Order to Gain a Pricing Advantage". Said provisional application is incorporated herein by reference.

REFERENCE TABLE SUBMITTED ON COMPACT DISK

FIELD OF THE INVENTION

The invention is in the field of insurance.

BACKGROUND

One of the factors that increases the cost of certain types of insurance coverage is voluntary lapse of a first insurance policy by the policy owner. An insurance company incurs a certain sales and start up expense when it sells a new policy. This expense is typically recovered, or amortized, in subsequent premium payments. If a policy owner lapses his policy before the initial sales and start up expense is recovered, then the insurance company may lose money on that policy.

Insurance companies measure lapse rates and factor the expected losses into their pricing. If an insurance company can lower its lapse rate, then it can potentially reduce its premiums for certain types of insurance policies.

Insurance policies that may have a lower cost impact in pricing due to lower lapse rates include homeowner's, auto, mortgage, and life insurance.

Known methods for reducing lapse rates include offering discounts upon renewal of a first insurance policy and increasing the attention paid by an insurance agent to an owner of a first insurance policy.

There is a long felt need, however, for additional effective means for reducing lapse rates of certain insurance coverages.

SUMMARY OF THE INVENTION

The Summary of the Invention is provided as a guide to understanding the invention. It does not necessarily describe the most generic embodiment of the invention or all species of the invention disclosed herein.

The present invention is, in part, a method and apparatus for reducing lapse rates of certain types of insurance coverage.

The method of the invention may comprise providing a rider to a first insurance policy. The rider provides insurance coverage for a contingent event in exchange for a premium Some aspect of the rider will reduce the anticipated lapse rate of the first insurance policy. Said aspect may include contingent events covered by the rider, benefit structure, continuance of coverage, eligibility for benefits, or combinations thereof.

The first insurance policy may be a homeowner's policy, auto insurance policy or other insurance policy that would have lower costs or improved profitability if its lapse rate were reduced.

The contingent event covered by the rider may be a medical expense associated with a pet. This type of coverage is termed "pet health insurance", or the like.

The apparatus of the invention may comprise a computer. The computer may comprise software for administering, pricing, underwriting or offering said rider for sale.

The apparatus of the invention may comprise a computer readable medium with software encoded thereon. The computer readable medium might be a CD, disk drive, or data transmission apparatus.

The invention may comprise software. The software may be embodied as data transmitted to a computer, said computer operating at least in part under the direction of the data in order to carry out at least a portion of the method of the invention.

DEFINITIONS

As used herein unless specifically indicated otherwise or clearly indicated otherwise by context, the term "rider" refers to a second insurance coverage which is only in force if a first insurance coverage is in force. The second insurance coverage may be attached to the first insurance coverage such that the combination of the first and second insurance coverage is a single insurance policy. Alternatively, the second insurance coverage may be constructively attached to the first insurance coverage such that the second insurance coverage is a second insurance policy and the first insurance coverage is a first insurance policy.

As used herein unless specifically indicated otherwise or clearly indicated otherwise by context, the term "Constructively attached" means a second insurance policy by its terms can remain in force for only so long as a first insurance policy remains in force.

As used herein unless specifically indicated otherwise or clearly indicated otherwise by context, the terms "pet" or "companion animal" refer to an animal which may be owned or cared for by one or more people. For example, a companion animal may be a dog or a cat. "One or more people" might be an individual person or a family.

As used herein unless specifically indicated otherwise or clearly indicated otherwise by context, the term "benefit" refers to money or other consideration provided by an insurance company to the owner of an insurance policy if a contingent event covered by the insurance policy occurs. For example, a benefit of $2,000 might be paid to the owner of a pet health insurance policy in the event that a pet covered by the insurance policy incurs a covered medical expense of $2,000.

BRIEF DESCRIPTION OF THE DRAWINGS

DETAILED DESCRIPTION

The following detailed description discloses various embodiments and features of the invention. These embodiments and features are meant to be exemplary and not limiting.

Method for Bundling Coverages in Order to Reduce the Impact of Adverse Lapse Rates for a First Insurance Policy One embodiment of the invention is a method for reducing the anticipated lapse rate of a first insurance policy, said first insurance policy having an increased profitability, higher income or lower cost when the lapse rate is reduced.

The method comprises offering to sell a rider to said first insurance policy, said rider comprising benefit features, said benefit features configured such that the combination of said rider and said first insurance policy has a higher switching cost than the switching cost of said first insurance policy alone and said rider is constructively attached to said first insurance policy, whereby said step of offering to sell is at least in part performed by technological means.

The method may alternatively comprise offering to sell a rider to a first insurance policy. The rider comprises benefit features. The benefit features are such that it is possible to price a combined rider and insurance policy using a lower lapse rate assumption than would otherwise be used for pricing the first insurance policy without the rider.

The first insurance policy may be a property or casualty policy, such as a homeowner's policy, or auto policy.

The first insurance policy may be a health care policy for one or more persons. The first insurance policy may be a life insurance policy for one or more persons.

A suitable rider is one in which the combination of the rider and the first insurance policy has a higher switching cost than the switching cost of the first insurance policy alone. "Switching cost" may refer to both monetary and non-monetary costs which would be incurred by the owner of a given insurance policy or given insurance policy and rider combination to replace said insurance policy, rider, or both with another insurance policy or policies providing the same or similar benefits.

Monetary switching costs include any net increase in expense for a given insurance coverage that an insured would incur due to switching from one insurance company to another. Examples of monetary switching costs include increases in premium for the same or similar coverage, loss of premium discounts, loss of accumulations towards a deductible, loss of coverage for preexisting conditions, or unavailability of similar coverage.

Non-monetary switching costs include any net increase in non-monetary expenses of a given insurance coverage that an insured would incur due to switching from one insurance company to another. Examples of non-monetary switching costs include any net increases in time, aggravation, and emotional distress spent or incurred by an insured in shopping for alternative insurance companies for the same or similar insurance coverage.

Examples of an increase in both monetary and non-monetary switching costs are presented in Example 1 of the present invention.

The rider may be a pet health insurance rider. The pet health insurance rider may cover losses due to medical care required for a companion animal.

The pet health insurance rider may be an inventive major medical pet health insurance rider as disclosed herein.

The method of the invention may comprise underwriting one or more proposed insureds for said rider. The method may comprise underwriting one or more proposed insureds for said combined rider and first insurance policy.

The method may comprise pricing said rider. The method may comprise pricing said combined rider and first insurance policy.

The method may comprise administering said rider. The method may comprise administering said combined rider and first insurance policy.

The method may comprise adjudicating claims against said rider. The method may comprise adjudicating claims against said combined rider and first insurance policy.

The method may comprise paying benefits against claims to said rider. The method may comprise paying benefits against claims to said combined rider and first insurance policy.

For insurance policies which would benefit from reduced lapse rates, a reduction in the lapse rate of a multiplicity of first insurance policies will result in improved profitability of said policies because premium revenue obtained from said policies would be increased. This would allow a more rapid amortization of the sales and administrative expenses of said policies.

A decrease of 1% in the lapse rate of a set of policies such as homeowner's policies, for example, might result in a 4% increase in the present value of the total premium collected from said policies. The increase in the present value of the total premium would result in increased profitability of the set of policies.

The additional profitability resulting from reduced lapse rates of a first insurance policy and rider may be used to increase the benefits of either the first insurance policy or the rider, reduce the premium of the first insurance policy or the rider, increase the profits to the insurance company, fund capital expenses of the insurance company, find promotional discounts or coupons or a combination thereof.

Major Medical Pet Health Insurance

A suitable rider for the present invention may be a pet health insurance rider which provides health care coverage for a pet in exchange for a premium. A preferred rider is one that provides major medical coverage for a pet. A method for providing major medical coverage comprises providing a relatively high deductible, such as $1,000 per year. The rider would cover medical costs incurred by the pet that were in excess of $1,000 in a given year.

A suitable annual deductible for major medical pet health insurance covering pets with average annual medical costs of $150 to $300 per year is in the range of $150 to $3,000 per year. Suitable annual deductibles for classes of pets with different average annual medical costs will be in the range of 1 to 10 times said average annual medical costs for said pets. A preferred range would be 1.5 to 7 times said average annual medical costs. A more preferred range would be 3 to 5 times said average annual medical costs.

All dollar values herein represent US currency as of 2001. Equivalent currency values for other jurisdictions and times may be computed by standard means. Said means might employ published exchange rates and inflation factors.

The rider of the present invention may have a cap of benefits over the lifetime of an insured pet. A suitable cap is $15,000 for a type of pet with an average medical cost in the range of $150 to $300 per year.

The rider would require the payment of a premium in order to be in force. A suitable premium might be in the range of $50 to $600 per year for a type of pet with average medical costs in the range of $150 to $300 per year. The premium would be suitable for a $500 deductible. The premium and deductible may be proportionally higher or lower for classes of pets with higher or lower average annual medical costs.

The inventive major medical pet health insurance rider disclosed herein may be offered as a stand-alone policy that is not contingent upon the maintenance of a first insurance policy.

Premium Calculation for Major Medical Pet Health Insurance

A suitable premium for a major medical pet health insurance stand alone policy or rider may be calculated by projecting the present value of the expected claims for the insured pet using a reasonable set of pricing assumptions. Reasonable assumptions for the insured pet may be based on the age of the pet, type of pet, breed of pet, species of pet, geographic location of pet, demographic characteristics of the owner of the pet, prior medical history of the pet and frequency of vaccinations of the pet. Other underwriting characteristics relevant to the frequency or severity of claims may also be used.

A suitable source of data for pricing major medical pet health insurance is the *U.S. Pet Ownership & Demographics Sourcebook*—2002 Edition (Sourcebook) published by the American Veterinary Medical Association. Said Sourcebook is incorporated herein by reference. The Sourcebook provides basic demographic data on pet ownership and information on veterinary expenditures with principal emphasis on dogs and cats.

A suitable method for estimating a premium for a major medical pet health insurance policy comprises the steps of:

identifying a class of pets to be insured;

estimating the distribution of annual veterinary expenses for the average pet of the species of said class of pet, said annual veterinary expenses optionally occurring within a first geographic region, occurring to pet owners in a first demographic category or occurring during a first time period;

optionally adjusting said distribution of annual veterinary expenses to account for the extent to which said average pets were covered by major medical health insurance policies;

adding the expected non-benefit related expenses to said distribution of annual veterinary expenses that be incurred by a first insurance company in order to provide said rider, said adding of said non-benefit related expenses yielding a set of average premiums versus deductibles;

optionally adjusting said set of average premiums versus deductibles to account for inflation from a point in time during said first time period to a subsequent point in time, said adjusting yielding a set of an inflation corrected premium;

optionally adjusting said set of inflation corrected premium to account for the difference between a particular pet to be insured and said average pet with respect to at least one of the age of said pet to be insured, the size of said pet to be insured or the breed of said pet to be insured, said optionally adjusting said set of inflation corrected premiums yielding a set of actual premiums to be charged for said particular pet to be insured; and optionally discounting said set of actual premiums by an amount governed by the vaccination frequency of said particular pet to be insured, said optionally discounting said set of actual premiums yielding said set of required premiums versus deductibles; and presenting said set of required premiums versus deductibles to a potential customer of said rider whereby at least one of said steps for calculating and presenting said set of required premiums versus deductibles is performed at least in part by technological means.

Distribution of Annual Veterinary Expenses

An exemplary estimated claim distribution table for veterinary expenses for the class of pets of dogs, for the geographic region of the United States, for the pet owner demographic category of residents of the United States, and for the time period of the year of 2001, can be derived from data provided in table 13 of page 95 of the Sourcebook. Table 13 provides survey data of dog health costs for dogs in the United States in 2001. An exemplary estimated claim distribution table derived from table 13 of the Sourcebook is shown in Table 1.

TABLE 1

Estimated Claim Distribution Table (Dogs) - Per Dog Experience for year 2001

| (1) Range of Annual Vet Charges | (2) Frequency | (3) Average Charge | (4) Annual Cost | (5) Accumulated Frequency | (6) Accumulated Annual Cost |
| --- | --- | --- | --- | --- | --- |
| $0 | 25% | $0 | $0.00 | 100% | $178.40 |
| $1-$49 | 12% | $25 | $3.00 | 75% | $178.40 |
| $50-$99 | 15% | $70 | $10.50 | 63% | $175.40 |
| $100-$199 | 20% | $140 | $28.00 | 48% | $164.90 |
| $200-$499 | 20% | $325 | $65.00 | 28% | $136.90 |
| $500-$999 | 6% | $700 | $42.00 | 8% | $71.90 |
| $1,000-$15,000 | 2% | $1,495 | $29.90 | 2% | $29.90 |

Table 1 is in the form of a "claims probability distribution" or "claims continuance" table of the type typically used to price indemnity type plans providing major medical benefits to humans with deductibles. Similar tables can be generated for veterinary charge data for particular geographic regions, demographic classes of pet owners and time periods.

Column 1 (Range of Annual Vet Charges) shows ranges of annual veterinary charges experienced by dogs in the US in 2001.

Column 2 (Frequency) shows the percent of all dogs in the US in 2001 that have annual veterinary charges in a given range.

Column 3 (Average Charge) shows the estimated average annual veterinary charges of the dogs in the US in 2001 with annual charges in a given range.

Column 4 (Annual Cost) shows the product of columns 2 and columns 3.

Column 5 (Accumulated Frequency) shows the percent of dogs in the US in 2001 with annual charges in a given range or greater.

Column 6 (Accumulated Annual Cost) shows the total annual veterinary charges of dogs in the US in 2001 with annual charges in a given range or greater, said annual veterinary charges having been divided by the total number of dogs to the give the charges on a per dog basis.

For example, referring to the row of Table 1 labeled "$50-$99":

15% of the dogs in the US in 2001 had annual veterinary charges in the range of $50 to $99.

This 15% of dogs had average annual veterinary charges of $70.

The product of 15% and $70 is $10.50.

63% of all dogs had annual veterinary charges of $50 or greater.

The total annual veterinary charges on a per dog basis for dogs with annual veterinary charges of $50 or greater was $175.40.

Adjusting claims Distribution for Coverage by Major Medical Pet Heath Insurance

It is anticipated that the average annual veterinary charges for dogs covered by major medical pet health insurance will be higher than for the average dogs described in Table 1 since only a few percent of dogs in the US were covered by any form of pet health insurance in 2001.

Dog owners that have their dogs covered by major medical pet health insurance will be more likely choose more expensive treatments to prolong the lives of their dogs rather than euthanize their dogs because they can't afford treatment. Table 2 illustrates a suitable adjustment to the distribution of annual veterinary expenses to account for the extent to which said average pets were covered by major medical pet health insurance policies. Adjustment was made to frequency (column 2) to account for this effect and then the table was recalculated.

TABLE 2

Expected Claim Distribution Table (Dogs) - Per Dog Covered by Major Medical Heatlh Insurance Experience for Year 2001

| (1) Range of Charges | (2) Frequency | (3) Average Charge | (4) Annual Cost | (5) Accumulated Frequency | (6) Accumulated Annual Cost |
|---|---|---|---|---|---|
| $0 | 25% | $0 | $0.00 | 100% | $214.10 |
| $1-$49 | 10% | $25 | $2.50 | 75% | $214.10 |
| $50-$99 | 14% | $70 | $9.80 | 65% | $211.60 |
| $100-$199 | 20% | $140 | $28.00 | 51% | $201.80 |
| $200-$499 | 20% | $325 | $65.00 | 31% | $173.80 |
| $500-$999 | 7% | $700 | $49.00 | 11% | $108.80 |
| $1,000-$15,000 | 4% | $1,495 | $59.80 | 4% | $59.80 |

The expected frequency of dogs with annual veterinary bills in the range of $500-$900 has been increased from 6% in Table 1 to 7% in Table 2. The expected frequency of dogs with annual veterinary bills in the range of $1,000-$15,000 has been increased from 2% in Table 1 to 4% in Table 2. The frequencies of dogs in the lower ranges have been adjusted down to keep the total frequency of all dogs to 100%. This shift in frequency results in anticipated average annual medical expenses for dogs with pet health insurance to be $214.10 (row $0, column 6, Table 2) versus $178.40 (row $0, column 6, Table 1) for average dogs.

An appropriate shift in frequency of high annual medical costs for pets of a given type due to the purchase of major medical pet health insurance may be based on data on euthanasia rates for average pets of said given type. One can expect that a certain percentage of euthanasias will be deferred in favor of more expensive medical treatment to prolong the life of the pet since said medical treatment is now covered by said pet health insurance. Said percentage of deferred euthanasias might be in the range of 20% to 70%. When an insurance company wished to estimate an appropriate shift in frequency of higher annual medical costs, therefore, they might assume that said percentage of euthanasias of average pets will become higher medical costs.

When an insurance company first prices said major medical pet health insurance coverages, however, it would be prudent for them to estimate that said percentage of deferred euthanasias is 100%. This would give them an extra margin of safety to cover future claims. As said insurance company develops experience with their policies, they might reduce said percentage without increasing their financial risk.

For dogs, for example, data from the Sourcebook indicates that between 2-3% of the veterinary visits by dog owning households during the period 1991-2001 were for the purchase of euthanasia services. If these dog owning households had major medical pet health insurance, many of them might have chosen higher cost medical treatments instead of euthanasia. A conservative estimate for the purpose of projecting an upper limit to anticipated claims against said major medical pet health insurance would be to assume that 100 percent of all of the households would have chosen medical treatment as opposed to euthanasia Hence the frequency of higher cost treatments (e.g. $500-$999 and $1,000-$15,000) can be increased by 2-3% (i.e. the percent of veterinary visits for euthanasia services) to estimate the higher benefits costs for dog owners with major medical pet health insurance.

Average Premiums versus Deductibles

The expected claim distribution table for dogs with major medical pet health insurance (Table 2) can be used to estimate of the relationship between expected claims against a major medical pet health insurance policy and various deductible levels for dogs covered by said policy. This is illustrated in Table 3.

Table 3 is the same as Table 2, but with columns 7 and 8 added.

TABLE 3

Relationship Between Deductible and Claims for Dogs Covered by Major Medical Pet Health Insurance Experience Year 2001

| (1) Range of Charges | (2) Frequency | (3) Average Charge | (4) Annual Cost | (5) Accumulated Frequency | (6) Accumulated Annual Cost | (7) Deductible | (8) Claims in Excess of Deductible |
|---|---|---|---|---|---|---|---|
| $0 | 25% | $ 0 | $ 0.00 | 100% | $214.10 | $ 0 | $214.10 |
| $1-$49 | 10% | $ 25 | $ 2.50 | 75% | $214.10 | $ 0 | $214.10 |
| $50-$99 | 14% | $ 70 | $ 9.80 | 65% | $211.60 | $ 50 | $179.10 |
| $100-$199 | 20% | $ 140 | $28.00 | 51% | $201.80 | $ 100 | $150.80 |
| $200-$499 | 20% | $ 325 | $65.00 | 31% | $173.80 | $ 200 | $111.80 |
| $500-$999 | 7% | $ 700 | $49.00 | 11% | $108.80 | $ 500 | $ 53.80 |
| $1,000-$15,000 | 4% | $1,495 | $59.80 | 4% | $ 59.80 | $1,000 | $ 19.80 |

Column 7 (Deductible) shows the deductible for a major medical pet health insurance policy. It is equal to the low limit of the range of column 1.

Column 8 (claims in Excess of Deductible) shows the expected claims against a major medical pet health insurance policy for policies with a given deductible. Column 8 is the same as column 6 less the Accumulated Frequency (Column 5) multiplied by the deductible. This would represent the cost of claims paid in excess of the deductible.

For example, if a deductible were $1,000 per year, then the expected claims against a major medical pet health insurance policy would have an average of $19.80 per dog (row $1000-$15,000, column 8, Table 3). The claim cost would be lower than the Accumulated Annual Cost (column 6) because only the cost of claims in excess of the $1,000 deductible would be paid as a benefit.

A suitable average premium versus deductible for a major medical pet health insurance policy can be estimated from the data in columns 7 and 8 of Table 3. The premium is equal to the expected claims in excess of the deductible against a major medical pet health insurance policy (column 8) plus a provision for expenses, such as sales, administrative, claims processing, and profit, associated with providing the pet health insurance policy. These other expenses can be estimated by assuming that they are 40% of the premium. This is the same as saying that the loss ratio is 60%.

A loss ratio of 60% is typical for insurance policies in the property and casualty category. Loss ratios in the range of 50-70% might be considered reasonable. Loss ratios as low as 30% or as high as 80% might be considered acceptable. Pets are regarded as property in the United States, hence pet health insurance is categorized as property and casualty insurance.

A suitable average premium for a given deductible, therefore, for major medical pet health insurance would be the claims in excess of the deductible (column 8, Table 3) divided by the loss ratio. Table 4 shows suitable premiums versus deductibles for a major medical pet health insurance policy covering dogs in the US in 2001. The policy provides 100% coverage for annual veterinary expenses greater than the deductible and less than $15,000.

Relationship Between Deductible and Annual Premium for Dogs Covered by Major Medical Pet Health Insurance Experience Year 2001

TABLE 4

Relationship Between Deductible and Annual Premium for Dogs Covered by Major Medical Pet Health Insurance Experience Year 2001

| (1) Deductible | (2) Annual Premium |
|---|---|
| $0 | $356.83 |
| $50 | $298.50 |
| $100 | $251.33 |
| $200 | $186.33 |
| $500 | $89.67 |
| $1,000 | $33.00 |

Column 1 (Deductible) is the annual deductible per dog. The policy pays all approved pet health care costs in excess of the deductible in a given policy year.

Column 2 (Annual Premium) is the annual premium that would be charged to insure a dog in the US in 2001. The premium would be due before the beginning of a given policy year.

The low premium relative to the maximum pet health care cost possible makes the insurance attractively priced.

A low premium relative to the maximum possible annual pet health care cost can be related to commonly purchased items, such as "a lunch a month in a restaurant", thus indicating to a potential consumer that the coverage is inexpensive. This will help improve the mass marketing of the insurance.

A high upper limit of benefits (e.g. $15,000) relative to the average annual health care costs of a pet helps promote the utility of the insurance policy for covering major medical pet health care costs.

Deductibles in the range of $500 to $1,000 also help promote the utility of reduced need for economic euthanasia Surveys have indicated that 30% of pet owners would euthanize their pet if the medical costs exceeded $1,000. Hence, by providing low cost major medical coverage for pets that cover expenses of $500 or greater, pet owners would be less inclined to euthanize their pets due to high medical expenses.

Inflation of Premiums

The average premiums versus deductibles charged for major medical pet health insurance can be adjusted for inflation of average pet health care costs to yield a set of inflation corrected premiums versus deductibles.

A reasonable inflation factor for dog veterinary expenses for the United States as of 2001 is about 7% per year. This inflation factor is based on the growth in average veterinary expenses for dogs per household from $131.80 to $186.80 to $261.30 for the years 1991 1996 and 2001 respectively. Inflation factors for other time periods can be similarly estimated.

An annual premium for 2006, for example, can be estimated from the premium schedule for 2001 as shown in Table 4. A premium suitable for 2001 would be by multiplied by a 5 year (2001 to 2006) inflation factor, such as $(1.07^5)$ or 1.40255. If a premium suitable for 2001 for a $500 deductible were $89.67 (row $500, column 2, Table 4), the corresponding premium for 2006 would be (1.4*$89.67) or $125.77.

Level Premiums

Major medical pet health insurance may be offered with a level premium for a given period of time. A suitable level premium for a given period may be estimated using an inflation factor for ½ the period of the level premium. If a level premium were to be offered for a period of four years, for example, then the premium would be adjusted for two years of inflation. If a policy had an annual premium of $89.67 per year at the beginning of a time period and the inflation factor were 7% per year, then a suitable annual level premium for four years would be $(1.07^2*\$89.67)$ or $102.66 per year.

The premium charged for a period of level premium may also take into account the anticipated growth in pet health expenses due to the aging of the pet. The anticipated growth in pet health expenses due to the aging of a pet in discussed in more detail below.

Premium Adjustments for Size and Age of Pets

A set of inflation corrected premiums versus deductibles can be adjusted for at least one of the age, size or breed of a particular pet to give a set of actual premiums to be charged for said particular pet. The premiums for major medical pet health insurance can be adjusted based on the size and age of a pet at the time the pet health insurance policy is issued. Older and larger dogs tend to have higher annual health care costs. Table 5 below shows how premiums can be adjusted for dogs of a given size and age at issue. The methods described below for dogs can be similarly applied to other species of pets.

TABLE 5

Annual Premiums for Different Age and Size Dogs

|  |  | Puppy<br><2 years<br>0.9 age factor | Young Adult<br>2-5 years<br>1 age factor | Middle Age<br>6-8 years<br>1.2 age factor | Old<br>9-10 years<br>1.5 age factor | Very Old<br>>10 years<br>2.5 age factor |
|---|---|---|---|---|---|---|
| Small<br><25 lbs | 0.8 size factor | $64.56 | $ 71.73 | $ 86.08 | $107.60 | $179.33 |
| Medium<br>25-50 lbs | 1 size factor | $80.70 | $ 89.67 | $107.60 | $134.50 | $224.17 |
| Large<br>>50 lbs | 1.2 size factor | $96.84 | $107.60 | $129.12 | $161.40 | $269.00 |

The columns "Puppy", "Young Adult", "Middle Age", "Old" and "Very Old" refer to dogs in the age ranges of <2, 2-5, 6-8, 9-10, and >10 years respectively.

The rows "Small", "Medium", and "Large", refer to the dogs in the weight ranges of <25 lbs, 25-50 lbs, and >50 lbs respectively.

Premiums for dogs in a given age range may be calculated using an appropriate "age factor". The age factors for "Puppy", "Young Adult", "Middle Age", "Old" and "Very Old" are 0.9, 1, 1.2, 1.5 and 2.5 respectively. These are shown below the column titles in Table 5. To calculate an appropriate annual premium for a given dog in a given age range, the estimated premium for an average dog (e.g. premiums of Table 4, $500 deductible) are multiplied by the age factor of the dog being insured.

Premiums for dogs in a given size range would be calculated using an appropriate "size factor". The size factors for "Small", "Medium", and "Large", are 0.8, 1, and 1.2 respectively. These are shown to the right of the row titles in Table 5. To calculate an appropriate annual premium for a given dog in a given size range, the estimated premium for an average dog (e.g. premiums of Table 4, $500 deductible) are multiplied by the size factor of the dog being insured.

A person skilled in the art will understand that the particular groupings of age and size can be modified for different ranges of ages and sizes. Also, there may be interactions between size and age that would lead to the use of combined size—age factors. Large dogs, for example might age more rapidly that small dogs and combined size—age factors could take this into account.

Similarly, there may be special factors to be used for individual breeds of dogs. A person skilled in the art will recognize that breed may be a characteristic used in place of size or in addition to size. A large purebred dog, for example, might age at a different rate than a large mixed breed dog. Similarly, two similarly sized breeds of dogs may also age at different rates or suffer different health problems. Similar considerations would apply to other species of pets, such as cats.

Vaccination Frequency

The premium for a conventional pet health insurance policy or the inventive major medical pet health insurance policy disclosed herein may be reduced if the frequency of rabies vaccinations and other vaccinations is reduced to the minimum required to both satisfy legal requirements governing a pet and comply with the recommendations of veterinarian professional organizations or veterinarian school protocols. If a set of actual premiums versus deductibles is adjusted, it yields a set of required premiums.

A common frequency for vaccination of cats and dogs against rabies in the United States has been once per year. This is a higher frequency than what is required to protect a cat or dog from disease and safeguard public health. Different jurisdictions within the United States, therefore, allow for less frequent vaccinations. The State of Colorado, for example, allows for a rate of vaccination for rabies of once every three years or less frequently with approval of a veterinarian as allowed by law. Many types of pet vaccinations are given at a greater frequency than what is required to provide adequate duration of immunity as reflected in studies done by the American Animal Hospital Association. Adverse reaction which can impair the health of companion animals is noted from over-vaccination and vaccinations that combine a number of different vaccines.

Adverse reaction rates within 45 days of vaccination can be in the range of 7% to 12% of treated animals. A lower frequency of vaccination will expose a companion animal to fewer opportunities of adverse health reactions due to vaccinations.

These adverse reactions might include autoimmune hemolytic disease. Medical treatment for autoimmune hemolytic can be in the range of $3,000 to $15,000. Despite this treatment, autoimmune hemolytic can be 70% fatal.

Hence, by reducing vaccination rate to the minimum allowed by law but still greater than what is required to safeguard pet and public health, the anticipated average health care costs and, in particular, major medical health care costs of a pet can be reduced. Hence reduced premiums or increased coverage can be offered for pets that have their vaccination frequency reduced from once per year to once per three years or lower frequency.

Reduced premiums for a preferred vaccination frequency can be offered for pet health insurance policies irrespective of whether or not the policies are major medical policies as described herein or not. Similarly, reduced premiums can be offered irrespective of whether or not pet health insurance is offered as a rider to a first insurance policy as describe herein.

A suitable discount for optimized vaccination frequency for a major medical pet health insurance policy is in the range of 5%-15%.

Presenting Premiums

A set of required premiums versus deductibles can be presented to a potential purchaser of a major medical pet health insurance rider by paper means, phone means or web means, such as a web page. A web page of premiums may be presented after an potential purchaser has input information necessary to determine the appropriate premiums. An example is presented in Example 1.

Computer Implementation

The calculations of the premiums for a first insurance policy, rider or combination of both may be performed on a general purpose computer, electronic calculator, or other calculating device.

A multiplicity of riders may be administered using a general purpose computer running appropriate software. The general purpose computer, for example, would process and track claims and premium payments.

A general purpose computer or other computing means may be used to perform underwriting calculations.

An information system comprising computers, telecommunications equipment, printers and monitors may be used to offer the rider to the market place.

A web site may be set up to present sales information to the general public. Portions of the web site may also be available to select people, such as policyowners of a first insurance policy. The web site may be configured to accept input information from a user and provide calculated results to the user. The calculated results may be a quote for a premium.

The web site may be set up to accept payment from a user for purchasing a rider. The web site may provide confirmation to the user for said purchase.

The rider may be elicited via advertising, direct response, agent solicitations on existing policies or combinations thereof. The rider may be sufficiently attractive to incent current policy holders to switch coverage from their current insurance company to the company offering it the rider.

A claims adjudication system may be set up with one or more providers of health care services to a pet. The providers may include veterinarians as well as alternative heath care providers under the supervision of a veterinarian. Alternative health care providers may comprise acupuncturists, homeopaths, osteopaths, massage therapists or other providers covered by the rider.

The health care providers would submit claims to the claims adjudication system and the system would provide appropriate payment to the providers, receipts to the providers and receipts to the insured.

Information obtained from claims processing may be used to influence laws in such a way as to increase companion animal health and longevity, thereby lowering risk factors and claim frequency.

An insurance ID card may be issued to the owner on behalf of the covered pet. The insurance ID card may be made at least in part from plastic. The insurance ID card may comprise an identifying number for the policy of the insured pet. The insurance ID card may comprise a magnetic strip or other data recording device to record information regarding the rider.

EXAMPLE 1

A homeowner has a first insurance policy in force to cover losses to their home. The first insurance policy is provided by a first insurance company. The coverage for the policy is $250,000. The annual premium for the policy is $1,000. The expected rate of claims for the policy is $600 per year. The expected rate of claims is fairly constant over the next 10 years.

If the homeowner wishes to switch to a second insurance company for similar coverage, the monetary switching cost would be $100 for incidental expenses (e.g. postage, phone calls, driving, etc.) less any savings in premium. The non-monetary switching cost would be 20 hours of personal time spent on, for example, researching alternative rates from other insurance companies, filing out forms, and making a decision.

The first insurance company offers to sell pet health insurance riders their homeowner insurance customers including said homeowner. The rider will be available only if the customers have a homeowner's policy in force with said first insurance company. The rider will only be in force if said customers remain as customers of said first insurance company.

The rider is offered in a mailing. The mailing is produced by computer controlled mailing system using computer stored data on said homeowner insurance customers. The mailing directs customers interested in the rider to either sign up on a web site, call an automated answering system or fill in and mail an application form to said first insurance company. The application form comprises computer readable printing, such as a bar code, so that the application forms can be automatically processed at least in part by a machine.

The insurance company offers a one-time discount of $50 for the homeowner's insurance premium for those that purchase the pet health insurance rider. The discount will be paid for by the anticipated reduced lapse rate for homeowners that purchase the rider.

Upon receipt of said offers to sell said riders, one or more of said homeowner insurance customers, including said homeowner, who had planned on lapsing said homeowner policies decide against said lapsing in anticipation of one day owning a pet and purchasing said rider. As a consequence, said first insurance company notices that their lapse rate has decreased upon making said offer to sell said riders, even before any of said riders are actually sold.

Said homeowner subsequently does acquire a dog and purchases said rider to said first insurance policy to cover the future major medical costs of the dog. The rider has a deductible of $1,000 per year and a lifetime cap of $15,000 for the dog. The policy pays 100% of the medical costs incurred by the dog that are in excess of the deductible in any given year. The rider is guaranteed to remain in force as long as the premiums for the rider are paid, even if the dog develops a chronic health problem that would make it otherwise uninsurable.

Prior to issuing health coverage under the rider, the dog is underwritten. The underwriting process comprises filling out a questionnaire. The questionnaire asks questions about the species, breed, and age of the pet. It also asks about specific preexisting conditions. The rider informs potential insureds that said rider will not be in force if the answers to the questionnaire are not truthful.

A web page is provided with the questionnaire. Potential insureds can fill out the questionnaire on line. The answers are used by a computer hosting the web site (or other suitable computer) to determine eligibility and premium for the potential insured. The web page may provide sequential questions whose answers determine on or more subsequent questions to be answered.

The potential insured may provide through the web site payment of a premium by automatic means, such as providing a credit card number. A rider then is purchased and in force.

The homeowner pays a level premium for the rider of $144 per year. The expected period of the level premium is 12 years. This premium includes a $10 per year discount (reflected in the $144 premium) for vaccinating the dog at a rate of no more than once every three years provided said rate is in compliance with laws governing the dog.

The rider is contingent upon the homeowner maintaining the first insurance policy in force or by replacing it with an allowed alternative policy offered by the same insurance company or other allowed insurance company. A description of allowed alternative insurance policies and allowed insurance companies is provided in the written contract of the rider. A list is also available on a web site. The list posted on the web is periodically updated. Updated lists are also mailed to insureds who have purchased riders.

As soon as the rider is in force, the monetary cost of switching insurance companies for the homeowner's coverage has increased. This increase is due, in part, to the probability that the dog has developed a chronic medical condition while the rider was in force that would make the dog uninsurable should the rider lapse.

8 years after the rider was first in force, the homeowner has paid $1152 in premiums for the rider but has not exceeded the deductible in any given year.

During year 8 of the rider, however, the dog develops a chronic health problem. The anticipated health care costs of the dog are now $4,000 per year. The life expectancy of the dog is three years with health care treatment. The dog would have to be euthanized if it did not get health care treatment. If the rider should lapse, the dog would be uninsurable due to anticipated cost of treating the chronic health problem.

The dog is beloved by the owner and the owner elects to continue medical treatment to extend the life of the dog rather than euthanize it. The owner can afford to pay the $1,000 per year deductible and the $144 per year premium to keep the ride in force. The owner cannot afford to pay the $4,000 per year total medical expenses should the rider lapse.

Said first insurance company pays the $3,000 per year in medical expenses that exceed the deductible in compliance with the terms of the rider.

Also in year 8 of the rider, the homeowner decides to move to a new house and must decide whether or not to maintain homeowner's insurance with said first insurance company.

If the homeowner insures the new house with an allowed insurance policy or allowed insurance company per the terms of the rider, then the rider remains in force and the pet health insurance remains in force.

If the homeowner insures the house with a non-allowed insurance policy, such as that provided by a second insurance company that is not on the list of approved insurance companies as specified in the rider contract, then the rider would lapse and the major medical coverage for the dog would terminate.

The monetary switching costs for changing insurance companies at this time have increased to at least $8,568. These costs include the anticipated benefits payments of $3,000 per year for the three year life expectancy of the dog under the rider less the $144 per year premium payment required to keep the rider in force. The homeowner cannot get similar pet health insurance coverage from another insurance company since the dog now has a chronic condition and is uninsurable.

The non-monetary switching costs have increased by the emotional distress that the homeowner would experience by having to make the difficult decision of whether or not to euthanize their dog due to the unaffordable expense of treating its chronic condition.

The homeowner elects to maintain coverage from their existing homeowner insurance provider and thus maintains the rider in force.

The homeowner subsequently submits a claim to the first insurance company for the costs of treating their dog. The insurance company obtains verification from the veterinarian providing the health care services for the nature, timing and cost of providing the services. The insurance company then pays the benefit appropriate to the claim.

EXAMPLE 2

An insurance company offers the pet health insurance rider of Example 1 to their homeowner insurance customers. The rider is offered in a mailing. The mailing is produced by computer controlled mailing system using homeowner insurance customer data. The mailing directs customers interested in the policy to either sign up on a web site, call an automated answering system or fill in and mail an application form to the insurance company. The application form comprises computer readable printing, such as a bar code, so that the application forms can be automatically processed at least in part by a machine.

The insurance company offers a one-time discount of $50 for the homeowner's insurance premium for those that purchase the pet health insurance rider. The discount will be paid for by the anticipated reduced lapse rate for homeowners that purchase the rider.

The insurance company sells 100,000 riders to their customers. They find that the lapse rate for those that purchase the rider decreases from 5% per year to 2% per year. The average sales cost to replace lapsed policies is $900 per lapsed policy. Hence the insurance company reduces its average cost per all policies owned by those that purchase riders by $27 per year. This provides a payback on said initial $50 discount of less than two years.

Insurance Regulation

One of skill in the art will recognize that insurance is a regulated industry. One practicing the methods described and claimed herein will want to maintain compliance with all applicable local, state and federal regulations, to ensure that the insurance policy is properly presented to the insured, premiums are properly approved, underwriting properly occurs, all necessary regulatory approvals are in place, etc.

While particular embodiments of the present invention have been illustrated and described, it would be obvious to those skilled in the art that various other changes and modifications can be made without departing from the spirit and scope of the invention. Any of the aspects of the invention of the present invention found to offer advantages over the state of the art may be used separately or in any suitable combination to achieve some or all of the benefits of the invention disclosed herein.

Therefore, we claim:

1. A computer based electronic method for determining and issuing an insurance policy comprising:
    providing a rider to a first insurance policy, a combination of the rider and the first insurance policy having a higher switching cost than the first insurance policy alone, the rider directed toward pet insurance;
    determining and presenting a set of premiums and deductibles for the rider by:
        identifying a class of pets to be insured;
        estimating a distribution of annual veterinary expenses for an average pet of a species of a class of pet to be insured based on a look-up table, the annual veterinary expenses optionally occurring within a first geographic region to pet owners in a first demographic category or during a first time period;

adding expected non-benefit related expenses to the distribution of annual veterinary expenses to be incurred by a first insurance company in order to provide the rider, the adding of the expected non-benefit related expenses yielding a set of average premiums versus deductibles, discounting a set of actual premiums by an amount governed by a vaccination frequency of the particular pet to be insured, the discounted set of actual premiums yielding a set of required premiums versus deductibles; and assembling and electronically presenting the set of required premiums versus deductibles to a potential customer of the rider; and issuing the insurance policy including the rider having a premium and a deductible.

2. The method of claim 1, further comprising adjusting the distribution of annual veterinary expenses, based on a percentage likelihood that more expensive treatment will be chosen, to account for ah extent to which average pets were covered by major medical health insurance policies.

3. The method of claim 1, wherein the set of average premiums is claims in excess of a deductible divided by a loss ratio.

4. The method of claim 1, further comprising adjusting the set of average premiums versus deductibles to account for inflation from a point in time during the first time period to a subsequent point in time, the adjusting yielding a set of inflation corrected premiums, wherein the inflation is based on growth in average veterinary expenses for a time period.

5. The method of claim 4, further comprising adjusting the set of inflation corrected premiums based on a schedule to account for the difference between a particular pet to be insured and the average pet with respect to at least one of age of the pet to be insured, size of the pet to be insured and breed of the pet to be insured, the adjusted set of inflation corrected premiums yielding a set of actual premiums to be charged for the particular pet to be insured.

* * * * *